US006572146B2

(12) United States Patent
Baginski

(10) Patent No.: US 6,572,146 B2
(45) Date of Patent: Jun. 3, 2003

(54) VEHICLE ELECTRICAL GROUND AND PROCESS

(75) Inventor: Frank T. Baginski, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/215,973

(22) Filed: Aug. 8, 2002

(65) Prior Publication Data

US 2002/0185851 A1 Dec. 12, 2002

Related U.S. Application Data

(62) Division of application No. 09/794,509, filed on Feb. 26, 2001, now Pat. No. 6,475,558.

(51) Int. Cl.[7] .......... B62D 21/18

(52) U.S. Cl. .......... 280/782; 180/311; 296/203.03; 296/204

(58) Field of Search .......... 280/781, 782; 180/311; 296/204, 203.03

(56) References Cited

U.S. PATENT DOCUMENTS

| | | | | | |
|---|---|---|---|---|---|
| 1,689,098 | A | * | 10/1928 | Wyman | 191/12.2 R |
| 2,916,396 | A | | 12/1959 | Perrenod | |
| 3,535,136 | A | | 10/1970 | Beene | |
| 4,220,962 | A | | 9/1980 | Sommer et al. | |
| 4,660,854 | A | * | 4/1987 | Suzuki et al. | 280/782 |
| 4,832,255 | A | | 5/1989 | Bickford et al. | |
| 4,861,941 | A | | 8/1989 | Kubo et al. | |
| 5,048,747 | A | | 9/1991 | Clark et al. | |
| 5,066,614 | A | | 11/1991 | Dunaway et al. | |
| 5,119,047 | A | | 6/1992 | Brown et al. | |
| 5,124,175 | A | | 6/1992 | Miracky et al. | |
| 5,232,145 | A | | 8/1993 | Alley et al. | |
| 5,255,752 | A | * | 10/1993 | Nakamura et al. | 180/6.7 |
| 5,261,514 | A | | 11/1993 | Evans | |
| 5,492,266 | A | | 2/1996 | Hoebener et al. | |
| 5,551,627 | A | | 9/1996 | Leicht et al. | |
| 5,675,889 | A | | 10/1997 | Acocella et al. | |
| 5,821,208 | A | | 10/1998 | Cala et al. | |
| 5,848,468 | A | | 12/1998 | Nann et al. | |
| 5,901,898 | A | | 5/1999 | Strempke | |
| 6,019,272 | A | | 2/2000 | Badgley et al. | |
| 6,029,882 | A | | 2/2000 | Bolde et al. | |
| 6,328,200 | B1 | | 12/2001 | Schredl et al. | |

* cited by examiner

*Primary Examiner*—Paul N. Dickson
*Assistant Examiner*—Deanna Draper
(74) *Attorney, Agent, or Firm*—Watts, Hoffmann, Fisher & Heinke Co.

(57) ABSTRACT

An over the highway heavy duty vehicle in the form of a selected one of a truck and a tractor is disclosed. The vehicle has a frame rail having a through aperture. A conductive solder ring is bonded to the rail and surrounds the aperture. A fastener extends through the aperture to secure an electrical connector in electrically conductive engagement with the ring. A ground cable is connected to the connector. A process for forming the ring is also disclosed.

9 Claims, 3 Drawing Sheets

VEHICLE ELECTRICAL GROUND AND PROCESS

This is a division of U.S. patent application Ser. No. 09/794,509, filed Feb. 26, 2001 now U.S. Pat. No. 6,475,558.

TECHNICAL FIELD

This invention relates to vehicles and more particularly to a method of and components for the grounding of vehicle electrical systems in a manner especially suitable for use in over the highway trucks and tractors.

BACKGROUND OF THE INVENTION

An over the highway truck or tractor is typically equipped with a frame that includes two elongate frame rails. In manufacture, a formed frame rail is moved along an assembly line where it is heat treated and cleaned. The rail stops for a brief period to have a serial number manually applied by a programmed engraving machine. Thereafter, a powder coat material is applied to the rail before the rail enters an oven heated to a temperature of 400° F. to 450° F. When the frame and the material are heated sufficiently, the powder is cured into a protective coating in a process which consumes from about 45 minutes to about an hour.

As a step in the manufacture of a motor vehicle, a small area of the cured protective coating is removed from the frame by grinding to provide a location for attachment of a ground in the form of an end weldable stud. Under current practice, the location of the end weldable stud is manually determined. Errors in determining that location can result in the stud being positioned at a location which interferes with subsequent assembly of the vehicle. In addition, the stud-welding operation is time consuming and expensive. It also creates a house cleaning problem in that each stud is surrounded by a ceramic insulator during the end welding operation. The ceramic insulator is broken away and typically the parts of it are allowed simply to fall to the floor below.

Accordingly, it would be desirable to provide a system for connecting a ground cable to a frame which eliminates the use of end weldable studs and its expense and problems.

SUMMARY OF INVENTION

With the present invention, a hole for a ground cable fastener is precision punched at the time when the frame is prepunched for other apertures. When the frame moving along a processing line pauses for the application of a serial number, steps of the novel process are also performed. These steps include applying a solder paste to the rail in an annular area around the prepunched grounding hole. Such an application may be on one surface or opposed surfaces of the frame rail. A locating and retaining projection of a mask is then inserted into the grounding hole to position an annular mask over the applied solder paste. Subsequently, the powder coating is applied and the frame is transported to a heated oven as in the prior art. During the heating of the frame in the oven, the paste forms a plated solder ring in the annular area to which the paste was applied. The ring is formed concurrently as the protective powder is fused into a protective coating. After the solder ring is formed the mask is removed.

The mask removal is done preferably as the frame is assembled into a vehicle. During the assembly a ground cable is brought into electrically conductive physical contact with the plated ring by a fastener extending through a cable contact and the hole around which the plated contact has been formed.

The preferred paste is a finely ground mixture of 50—50 tin and lead combined with applicable flux. A commercially available paste which tests have shown to be appropriate for the purpose is sold by Bon Electronic of Sayreville, N.J. Bon Electronic makes the flux available for application by a dispenser in the nature of a caulking or cookie gun which is adapted to dispense the material through a multi-orificed or nozzle applicator to form annular rings. Alternatively, the paste can be applied by techniques such as use of a brush.

The advantages include reduced time for manufacture because all steps are preformed concurrently with other manufacturing steps. Other advantages include elimination of the steps of measuring to determine a location for a weld stud to be located and preparation of the frame for the application of the weld stud as well as the application of the weld stud itself. The ultimate weight of the vehicle is reduced slightly, which is vital to over the highway haulers. In addition, labor on a moving truck assembly line is reduced and a part number is eliminated.

Another important factor is, one eliminates the corrosion which occurs around the frame weld at the stud location and at a non-plated weld end shoulder of the stud. Obviously, there are additional savings in electricity, maintenance, labor and need for ceramic insulators as well as weld studs, plus the housekeeping improvements occasioned by the lack of insulator pieces after the insulators are broken.

For service and repair one simply needs to clean a desired area to bare metal, apply the paste and heat it with any suitable heat source such as a propane torch.

Accordingly, the objects of the invention are to provide a novel and improved method and apparatus for effecting ground connections in motor vehicles.

DESCRIPTION OF PREFERRED EMBODIMENT

Figure 1:
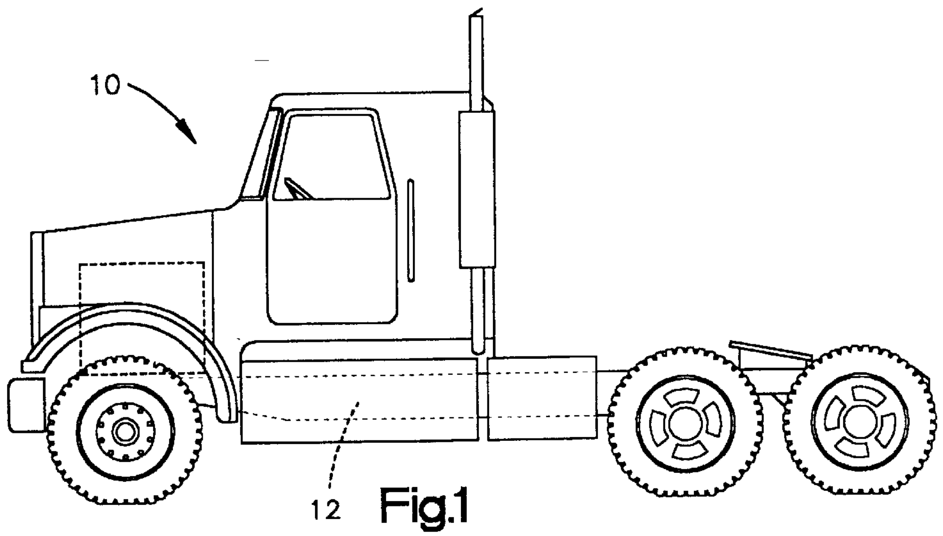
FIG. 1 is an elevational view of an over the highway truck or tractor.

Referring to FIG. 1, an over the highway heavy duty vehicle in the form of a truck or tractor is shown generally at 10. The vehicle 10 includes the usual pair of longitudinally extending frame rails, one of which is shown at 12.

Figure 2:
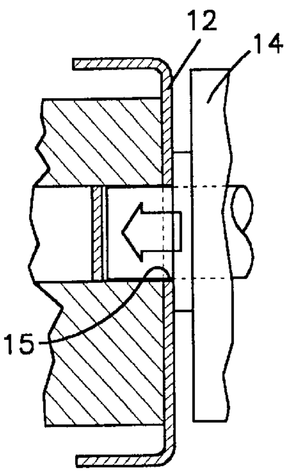
FIG. 2 is a somewhat schematic cross-sectional view of a vehicle frame rail being punched to perform a hole in the rail.
Figure 3:
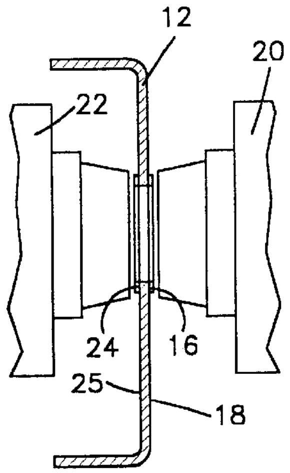
FIG. 3 is a sectional view of the frame rail with a schematic showing of rings of solder and flux paste being applied to the rail.

In the manufacture of a frame rail 12, the rail is transported to a work station as indicated schematically in FIG. 2. At that station, the frame is punched for requisite apertures. One such punch is shown schematically at 14 in FIG. 2. The punch 14 forms a hole 15 which is intended for use in connecting a ground cable to the frame. In the usual manufacturing operation, the frame moves from the punch work station to a further work station where a vehicle serial number is stamped into the frame.

In the preferred practice of the present invention, the steps illustrated in FIGS. 3–6 are performed at the work station where the serial number is stamped. When the rail is at this second station, a ring of solder paste 16 is applied to a face 18 of the frame rail. Preferably the ring is applied by a device 20 resembling a caulking gun which will extrude an endless ring of solder paste and apply it to the frame face 18 around the hole 15. The device 20 may be computer controlled and use pneumatic pressure to expel the paste. In its preferred form the paste will completely surround the hole and be of from 1 to 1.25 inch in diameter.

When contact with both faces of the rail 12 is desired, a second caulking gun 22 applies a further paste ring 24 to an inner or opposed face 25 of the rail 12. A preferred application nozzle for application of the solder paste is sold under the trademark SEMCO® by Courtaulds Aerospace, Inc. of 5454 San Fernando Road, P.O. Box 1800, Glendale, Calif. 91203. The preferred nozzle is designated Floorboard Nozzle P/N 231674.

Figure 4:
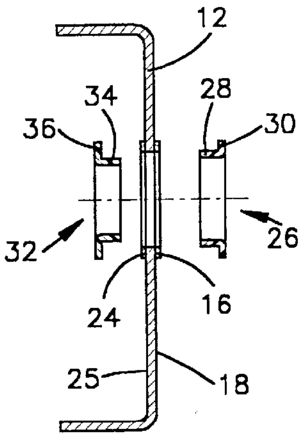
FIG. 4 corresponds to FIG. 3 adding a showing of solder protecting masks being positioned to project through the hole and cover the solder paste.
Figure 4A:
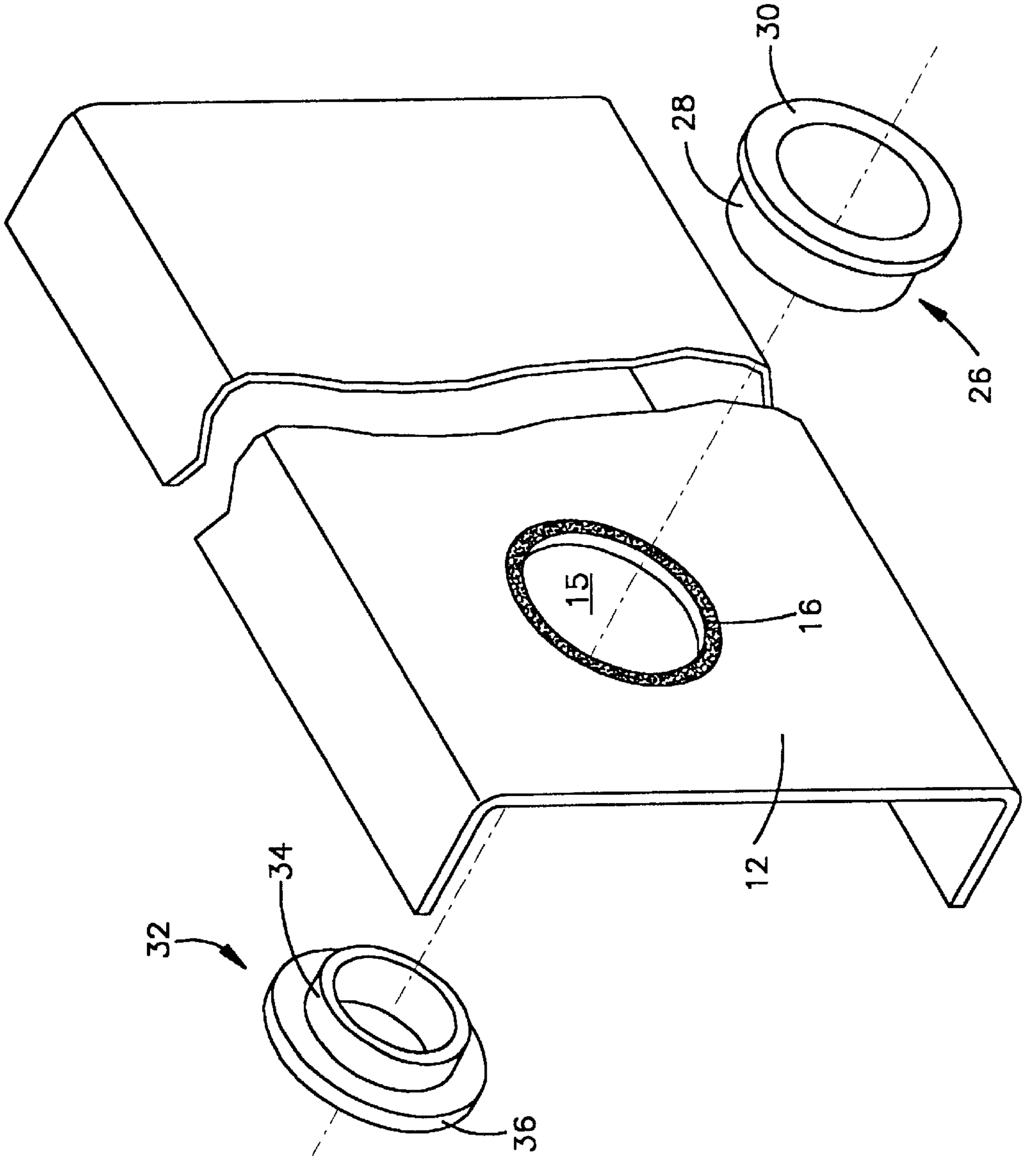
FIG. 4A is a perspective and foreshortened view of the rail as the masks are being inserted to cover applied solder paste.
Figure 5:
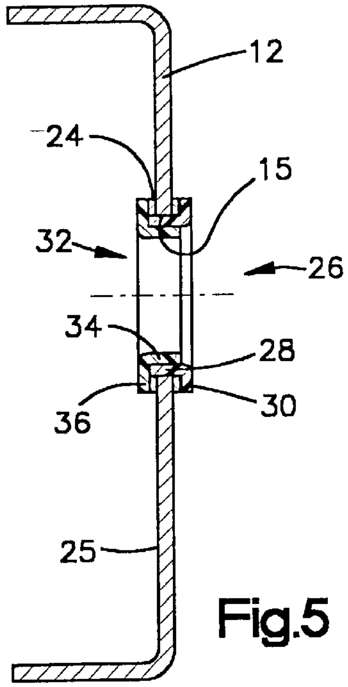
FIG. 5 corresponds to FIG. 4 with the masks connected to the frame.

As is best seen by reference to FIGS. 4 and 4A, a tubular outer mask 26 is provided. The mask 26 includes a cylindrically contoured tubular section or stem 28 which extends into the aperture 15 in a close fit with the walls defining the aperture. The mask 26 also includes a mask ring 30 which overlies and protects the ring of solder paste 16.

Where inner and outer solder rings are being formed, an inner mask 32 is provided. The inner mask 32 includes a tubular section 34 that extends into the outer mask tubular section 28. The tubular sections are closely fit in telescopic relationship so that friction between them retains in the masks in the paste shielding position of FIG. 5. In the position of FIG. 5, a mask ring 36 overlies the inner paste ring 24 as a protective covering.

Preferably the masks are formed by injection molding. The masks are formed of a heat resistant plastic material. The preferred material is a polyethermide resin sold by General Electric Company under the trademark ULTEM®.

Figure 6:
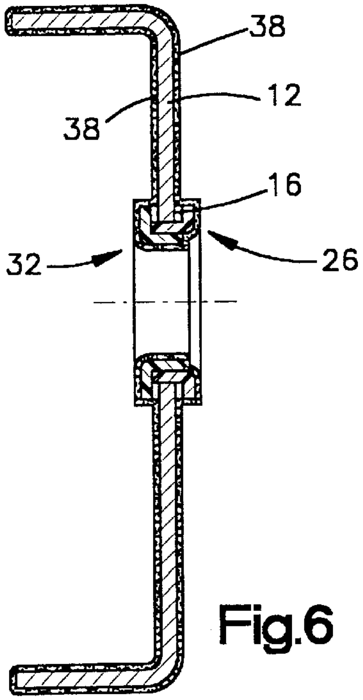
FIG. 6 shows the frame rail after a fusible protective coating has been applied to surfaces other than those protected by the masks.
Figure 7:
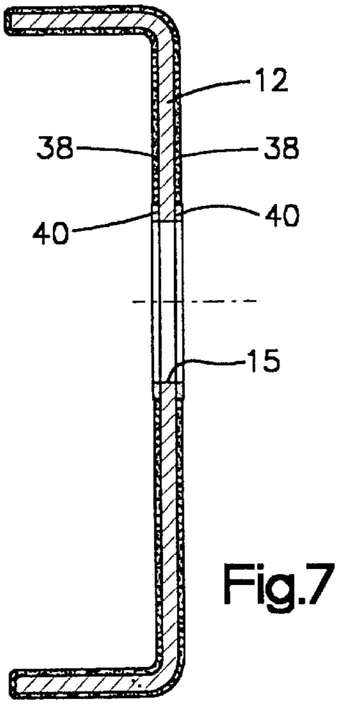
FIG. 7 is a sectional view of the frame rail after it has passed through an oven to cure the protective coating and fuse the solder and the masks have been removed; and, FIG. 8 is a sectional view of the frame rail with a cable connected in electrical contact with the frame rail via the solder rings that have been formed.

Once the paste rings and protective masks have been positioned, a protective coating 38 is applied to the frame rail 12, FIG. 6. The now usual protective coating is a spray applied, powder coating material. Once the powder coating has been applied, the rail is placed in an oven heated to a temperature of about 400–450° F., and maintained in the oven at that temperature until the powder is cured. A typical cure time for materials currently being used is from 45 minutes to an hour. Concurrently, with the curing of the protective coating, the applied ring or rings of solder paste material is or are fused into conductive solder ring(s) 40 bonded to the rail 12, FIG. 7.

Figure 8:
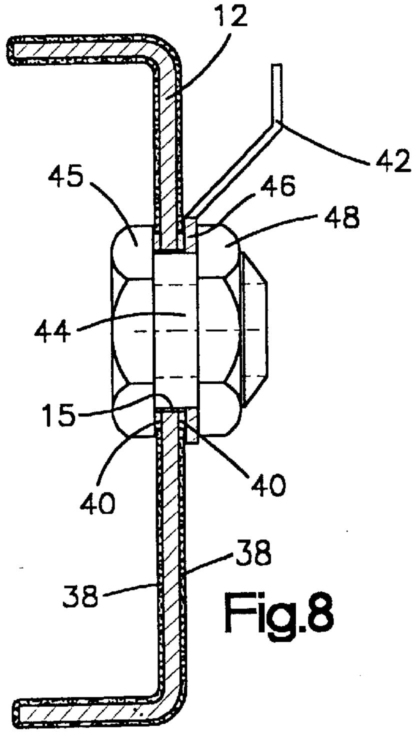

The masks 28, 32 are removed. The frame rail in due course, is assembled to produce the vehicle 10. Ideally the masks will not be removed until assembly so that they function to protect the solder contact rings 40 during handling and shipping. During the assembly process, an electrical cable 42 is connected to the frame rail, FIG. 8. To this end, a fastener shown in the form of a bolt 44 is inserted through the punched hole 15. As depicted in FIG. 8, a bolt head 45 is in close electrically conducting engagement with the inner one of the solder rings 40. As will be obvious to those skilled in the art, a washer can be inserted between the head 45 and the inner one of the solder rings 40. The bolt projects through the aperture 15 and an apertured cable connector 46 as well. A nut 48 tightly engages the bolt 44 to clamp the cable connector 46 against the outer one of the solder rings 40. Typically, a washer (not shown) may be placed between the nut 48 and the connector 46.

When a repair of a contact ring 40 is required, the ring is cleaned by sanding or grinding to expose bare metal. A solder paste is applied by conventional techniques such as with a brush. The paste is heated to fuse the metal in the paste. Flux residue is wiped from the surface of the fused metal with a damp cloth or towel. If the repaired contact ring is uneven, further heating will smooth the ring.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

What is claimed is:

1. In an over the highway heavy duty vehicle the improvement comprising:

a) an apertured frame rail;

b) a ring of solder adhered to a frame rail surface and surrounding an aperture;

c) a protective coating substantially covering the surface other than the ring; and d) a ground cable secured to the rail in electrically conductive contact with the ring.

2. The improvement of claim 1 further including a second ring of solder adhered to an opposed surface of the rail and electrically connected to the cable via a fastener securing the cable to the rail.

3. In an over the highway heavy duty vehicle in the form of a selected one of a truck and a tractor the improved combination comprising:

a) a frame rail having a through aperture;

b) a conductive ring bonded to the rail and surrounding the aperture;

c) a fastener extending through the aperture; and, d) an electrical connector having a portion interposed between the fastener and the ring and maintained in electrically conductive engagement with the ring by the fastener.

4. The combination of claim 3 wherein there are two conductive rings respectively on opposite faces of the rail around the aperture with the second mentioned ring in electrically conductive contact with the fastener whereby both the fastener and the connector are positioned to conduct electricity to and from the rail.

5. The combination of claim 4 wherein a ground cable is connected to the connector.

6. The combination of claim 3 wherein a ground cable is connected to the connector.

7. The combination of claim 3 wherein a protective coating is adhered to the frame rail around the ring.

8. The combination of claim 3 wherein the ring is solder.

9. A heavy duty vehicle frame comprising:

a) a spaced pair of elongate frame rails;

b) cross members secured to the rails to maintain the rails in spaced relationship;

c) at least one of the rails including a through aperture and a ring of solder surrounding the aperture;

d) a protective coating adhered to the frame; and, e) the coating including a portion surrounding the ring whereby the ring is exposed to facilitate electrical contact of a conductor but the frame is otherwise protected by the coating.

* * * * *